(12) United States Patent
Blanc

(10) Patent No.: US 9,180,564 B2
(45) Date of Patent: Nov. 10, 2015

(54) DEVICE FOR SECURING A CAP SCREW TO AN ELEMENT THAT IS TO BE ATTACHED TO ANOTHER ELEMENT

(75) Inventor: Hugues Blanc, Lezigneux (FR)

(73) Assignee: DURA AUTOMOTIVE SYSTEMS SAS, Bievres (FR)

( * ) Notice: Subject to any disclaimer, the term of this patent is extended or adjusted under 35 U.S.C. 154(b) by 0 days.

(21) Appl. No.: 14/110,078

(22) PCT Filed: Apr. 2, 2012

(86) PCT No.: PCT/FR2012/050711
§ 371 (c)(1),
(2), (4) Date: Dec. 17, 2013

(87) PCT Pub. No.: WO2012/136922
PCT Pub. Date: Oct. 11, 2012

(65) Prior Publication Data
US 2014/0090237 A1    Apr. 3, 2014

(30) Foreign Application Priority Data
Apr. 4, 2011 (FR) ..................................... 11 52847

(51) Int. Cl.
| F16B 39/00 | (2006.01) |
| B23P 19/04 | (2006.01) |
| F16B 41/00 | (2006.01) |
| F16B 5/02 | (2006.01) |
| F16C 1/26 | (2006.01) |
| F16B 19/02 | (2006.01) |
| F16B 43/00 | (2006.01) |

(52) U.S. Cl.
CPC ............... *B23P 19/04* (2013.01); *F16B 5/0258* (2013.01); *F16B 41/002* (2013.01); *F16C 1/262* (2013.01); *F16B 19/02* (2013.01); *F16B 43/00* (2013.01); *Y10T 29/53* (2015.01)

(58) Field of Classification Search
CPC .......................................................... F16C 1/262
USPC ........................................ 411/107, 517, 521
See application file for complete search history.

(56) References Cited

U.S. PATENT DOCUMENTS

| 2,648,247 A | * | 8/1953 | Schmuziger | ................... 411/479 |
| 3,139,768 A | * | 7/1964 | Biesecker | .................... 74/502.4 |
| 3,603,626 A | * | 9/1971 | Whiteside | .................. 403/408.1 |
| 3,752,515 A | * | 8/1973 | Oaks et al. | ..................... 403/344 |

(Continued)

FOREIGN PATENT DOCUMENTS

| JP | H02-30518 U | 2/1990 |
| WO | 2007/087991 A1 | 8/2007 |

*Primary Examiner* — Roberta Delisle
(74) *Attorney, Agent, or Firm* — Seed IP Law Group PLLC

(57) ABSTRACT

The cap screw (1) has a threaded portion (1b) having a nominal diameter (D1) that is greater than the diameter (D3) of its shank. The device comprises an anti-creep ring (4) designed to receive screw (1), one end of which has features (4a-4b-4c-4d) suitable for delineating, before ring (4) is engaged in a recess (2a) of element (2) that is to be screw fastened, a circular area having a diameter (D) that is greater than the nominal diameter (D1) of threaded portion (1b) and, after said ring (4) has been engaged in said recess (2a), a circular area (D) having a diameter (D2) that is less than the nominal diameter (D1) of threaded portion (1b), but greater than the diameter (D3) of shank (1a), so as to act as a stop for said threaded portion and trap screw (1) in ring (4) while permitting limited movement of the screw.

9 Claims, 4 Drawing Sheets

(56) References Cited

U.S. PATENT DOCUMENTS

| | | | |
|---|---|---|---|
| 4,697,968 A * | 10/1987 | Veronesi | 411/113 |
| 6,582,171 B2 * | 6/2003 | Bondarowicz et al. | 411/353 |
| 6,688,826 B2 * | 2/2004 | Agha et al. | 411/352 |
| 7,241,095 B2 * | 7/2007 | Apsey | 411/351 |
| 7,828,502 B2 | 11/2010 | Chretien et al. | |
| 2004/0062621 A1 * | 4/2004 | Jiang et al. | 411/353 |

* cited by examiner

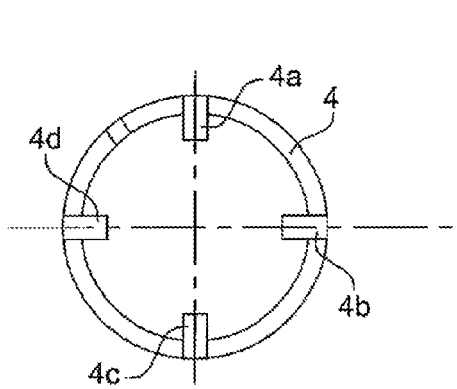
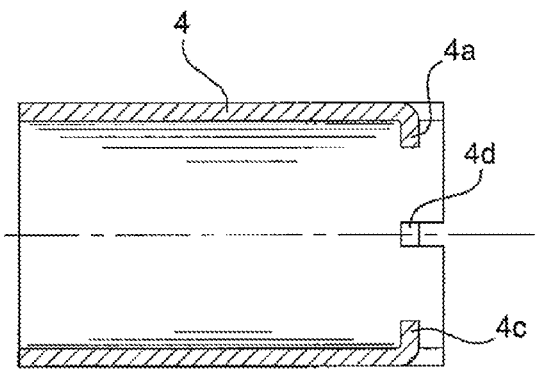
Fig. 6  Fig. 7
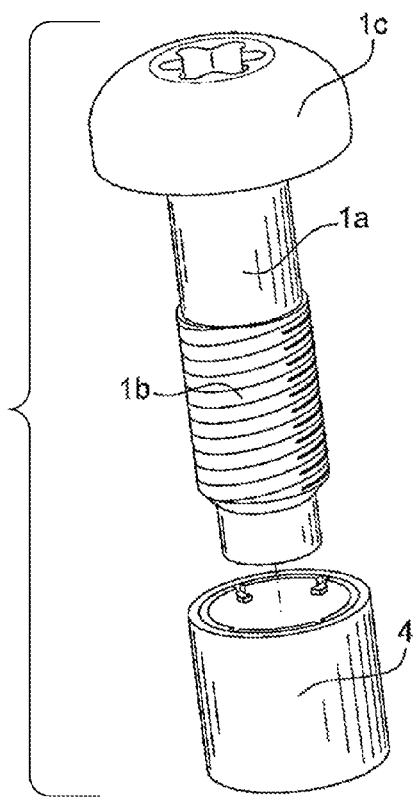
Fig. 8
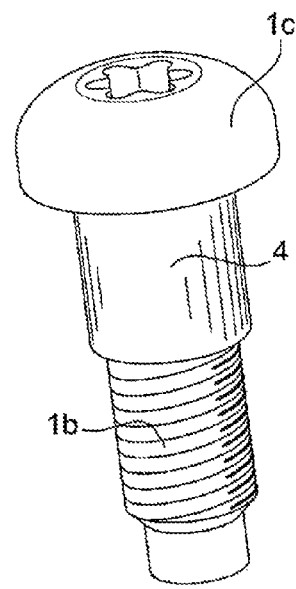
Fig. 9

DEVICE FOR SECURING A CAP SCREW TO AN ELEMENT THAT IS TO BE ATTACHED TO ANOTHER ELEMENT

BACKGROUND

1. Technical Field

The invention relates to the technical field of fasteners and, more particularly, to a device for securing a cap screw to an element that is to be attached to another element.

The invention has a particularly advantageous application in the field of automotive engineering, for example, in order to attach a cable to its cable stop.

2. Description of the Related Art

When a cable for changing or selecting a gear is mounted on its cable stop by means of a screw, the operator finds it very difficult to hold both the cable, the cable stop, the screwing member and the actual screws. In fact, the cable stop must be correctly positioned relative to the support and the holes intended to receive the cap screws must line up perfectly in order to be able to fit and tighten said screws.

To try and overcome these drawbacks, equipping the element that is to be screw fastened to a support of any kind with captive screws has been suggested. These captive screws are generally secured in the element by crimping, are of a special design and are consequently more expensive than standard screws.

BRIEF SUMMARY

The invention has set itself the object of overcoming these drawbacks in a simple, dependable, effective and efficient manner.

The problem that the invention intends to resolve is to be able to secure a cap screw to an element that is to be attached to another element with the first object being to make the screw a captive component of the element, and the second object being to use a conventional screw that has a threaded portion having a nominal diameter that is greater than the diameter of the screw shank.

In order to solve such a problem, the device according to the invention comprises an anti-creep ring designed to receive the screw and having one end which has features suitable for delineating, before the ring is engaged in a recess of the element that is to be screw fastened, a circular area having a diameter greater than the nominal diameter of the threaded portion and, after said ring has been engaged in said recess, a circular area having a diameter that is less than the nominal diameter of the threaded portion, but greater than that of the shank so as to act as a stop for said portion and to trap the screw in the ring, while permitting limited movement of said screw in the ring.

As a result of these provisions, after mounting the anti-creep ring in its recess, the latter traps the screw as a captive screw. A single component performs two functions—captive screw and anti-creep ring.

To solve the problem of maintaining the screw after the ring has been engaged in its recess, said ring has features suitable for allowing elastic deformation as a result of the ring being engaged in the recess of the element, said deformation corresponding to a reduction in the diameter of the circular area.

To solve the problem of allowing elastic deformation of the ring, allowing coaxial movement of the screw in the anti-creep ring and creating an area of abutment for the threaded portion in order to retain the captive screw, the features of the ring suitable for delineating a circular area having a variable diameter due to elastic deformation consist of a slot formed over the entire length of said ring and the stop effect is obtained by at least two projections that protrude from one of the ends of the bore of the ring. Advantageously, the two projections are diametrically opposite each other and at least two projections are obtained by cutting and folding the ring.

According to another aspect, the length of the screw exceeds the length of the ring with the threaded portion being formed at the end of the screw shank. The length of the ring corresponds substantially to the depth of the recess of the element.

As shown, the device according to the invention has an advantageous application in the automotive field for attaching a cable to a cable stop, but not to the exclusion of other applications, not only in the automotive industry, but also in other sectors of industry.

BRIEF DESCRIPTION OF THE SEVERAL VIEWS OF THE DRAWINGS

The invention is explained below in greater detail, reference being made to the accompanying drawings in which:

FIG. 6 is a top view of one embodiment of the anti-creep ring.

FIG. 7 is a longitudinal cross-sectional view corresponding to FIG. 6.

FIG. 8 is a perspective view of a screw before engagement of the anti-creep ring.

FIG. 9 is a view corresponding to FIG. 8 after engagement of the screw in the anti-creep ring.

DETAILED DESCRIPTION

As stated, the problem is to secure a cap screw (1) to an element (2) that is to be attached to another element (3). The shank (1*a*) of screw (1) has a threaded portion (1*b*) having a nominal diameter that is greater than the diameter of said shank (1*a*).

Figure 1:
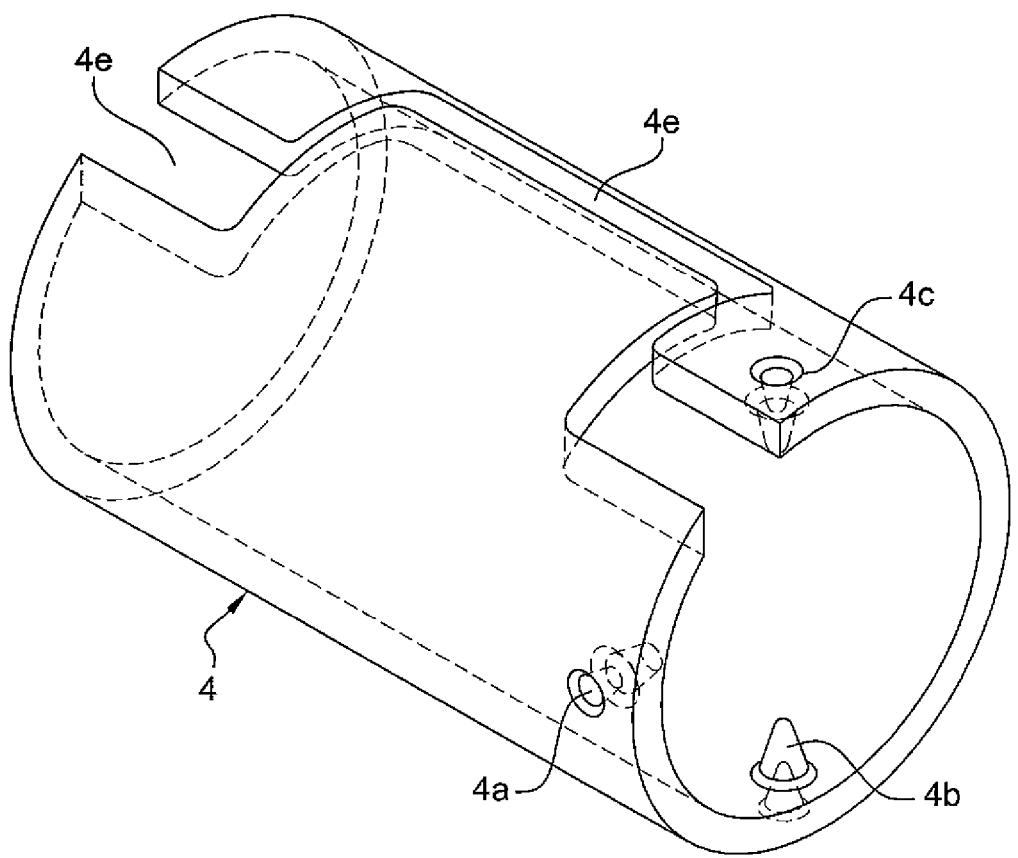
FIG. 1 is a perspective view of one embodiment of the anti-creep ring according to the invention.

The device according to the invention comprises an anti-creep ring (4), one end of which has features suitable for delineating a circular area having a diameter (D) greater than the nominal diameter (D1) of threaded portion (1*b*). As shown in FIGS. 1, 6 and 7, this diameter (D) can be defined by at least two projections (4*a*) and (4*b*) formed so that they protrude from one end of the bore of ring (4).

Projections (4a) and (4b) are preferably diametrically opposite each other. In FIGS. 6 and 7, ring (4) has four projections (4a, 4b, 4c, 4d) which are offset by 90°. For example, these projections can be obtained by cutting and folding the ring.

Ring (4) has further features that allow it to undergo elastic deformation due to the effect of engaging it in a recess (2a) of element (2). For example, this capacity of elastic deformation is obtained, as shown in FIG. 1, by a slot (4e) formed along the entire length of the ring and its generatrices. This slot (4e) may, for instance, have a median zone of reduced width that is symmetrically connected to two end regions having a larger width.

After ring (2) equipped with screw (1) has been engaged in the recess (2a) of element (2) and after said ring has been tightly fitted in said recess, the ring is deformed so that the circular area defined by projections (4a, 4b, 4c, 4d) which initially has a diameter (D) then has a diameter (D2) which is greater than the diameter (D3) of shank (1a), but less than diameter (D1) of threaded portion (1b) in order to act as a stop for said threaded portion. Screw (1) can then be moved in ring (4) between a position in which its head (1c) is stopped by element (2) and a position in which threaded portion (1b) is stopped by projections (4a, 4b, 4c, 4d). The length of screw (1) is greater than that of ring (4).

Figure 2:
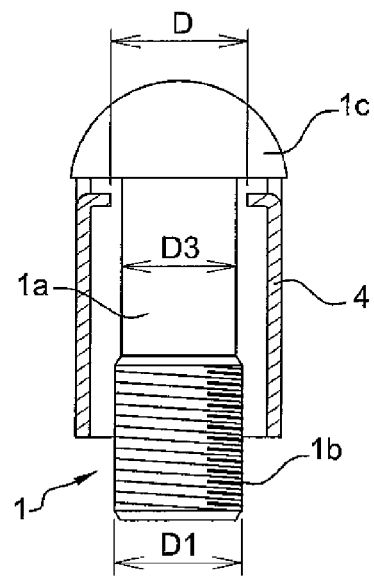
FIG. 2 is a longitudinal cross-sectional view showing engagement of the screw in the anti-creep ring before it is mounted in a recess of the element that is to be attached.
Figure 3:
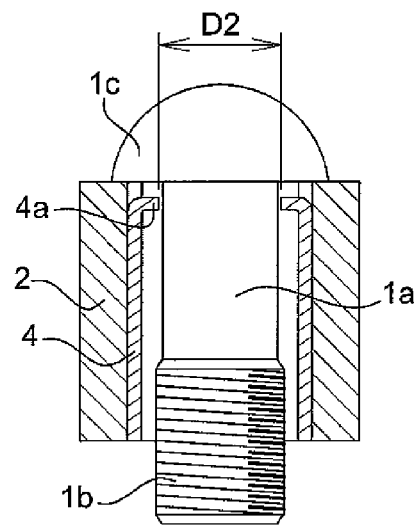
FIG. 3 is a view corresponding to FIG. 2 after engagement of the screw and anti-creep ring assembly in the recess of the element.
Figure 4:
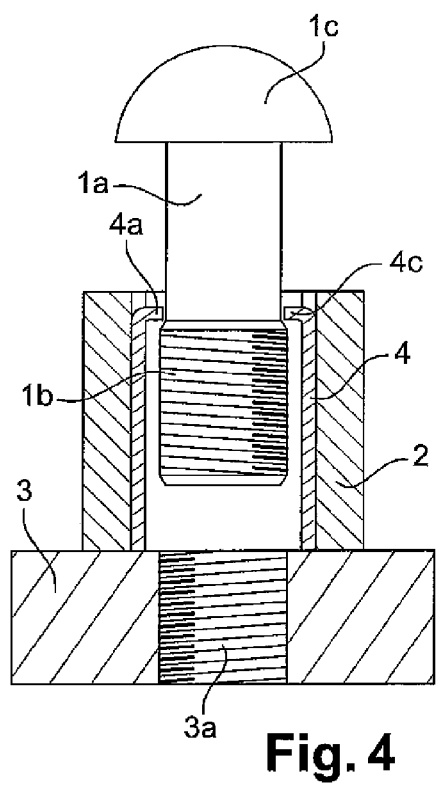
FIG. 4 is a view corresponding to a FIG. 3 showing the position of the element equipped with the screw and anti-creep ring assembly before attachment to another element.

FIGS. 2 to 5 in particular show an embodiment of the device according to the invention that is used in order to join two elements (2) and (3). In FIG. 2, screw (1) is freely engaged in the bore of ring (4). In this position, i.e. before the anti-creep ring is engaged in element (2), the circular area delineated by projections (4a, 4b, 4c, 4d) delineates a diameter (D) that is greater than the diameter (D1) of threaded portion (1b). After the screw (1)/ring (4) assembly has been engaged in recess (2a) of element (2), ring (4) is elastically deformed due to the effect of it being tightly fitted in said recess, so that the circular area delineated by projections (4a, 4b, 4c, 4d) has a diameter (D2) that is smaller than the diameter (D1) of the threaded portion. Because diameter (D2) is greater than the diameter (D3) of the shank (1a), screw (1) can be freely coaxially displaced in the anti-creep ring from the position in which its head (1c) is stopped by element (2) as far as the position in which the threaded portion (1b) is stopped by projections (4a, 4b, 4c, 4d) (FIGS. 3 and 4).

Figure 5:
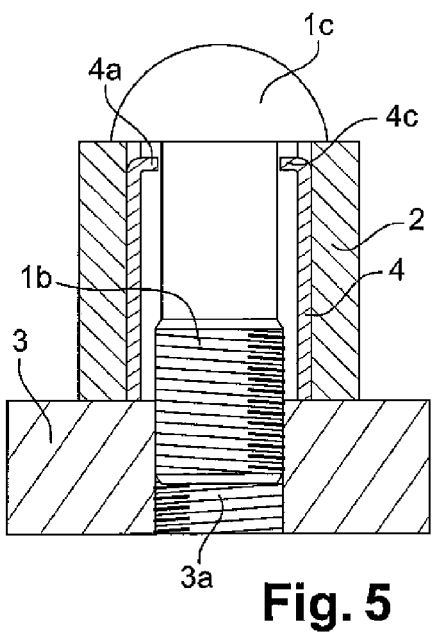
FIG. 5 is a view corresponding to FIG. 4 showing assembly of the two elements.

It then suffices to place element (2) equipped with the screw (1)/anti-creep ring (4) assembly so that it lines up with a tapped hole (3a) in element (3) to which element (2) is to be attached (FIG. 4). In this position, screw (3) is trapped in anti-creep ring (4) which is fitted in the recess of element (2). One can then, in a conventional manner, tighten screw (1) in the internal thread (3a) of element (3) (FIG. 5).

Figure 10:
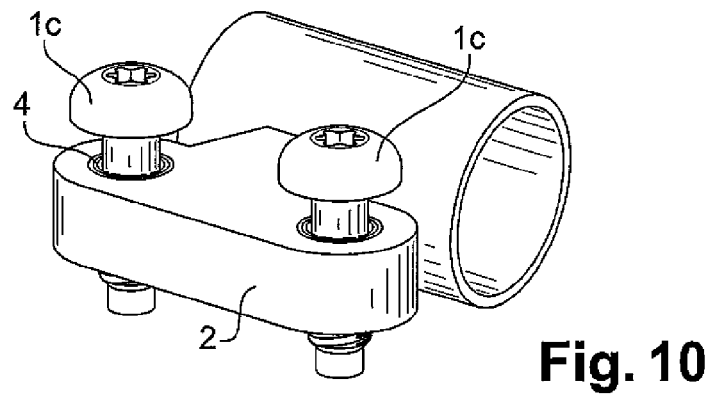
FIG. 10 is a perspective view showing, in a non-limiting manner, the mounting of two screw/anti-creep ring assemblies on a component part, for example a cable stop.
Figure 11:
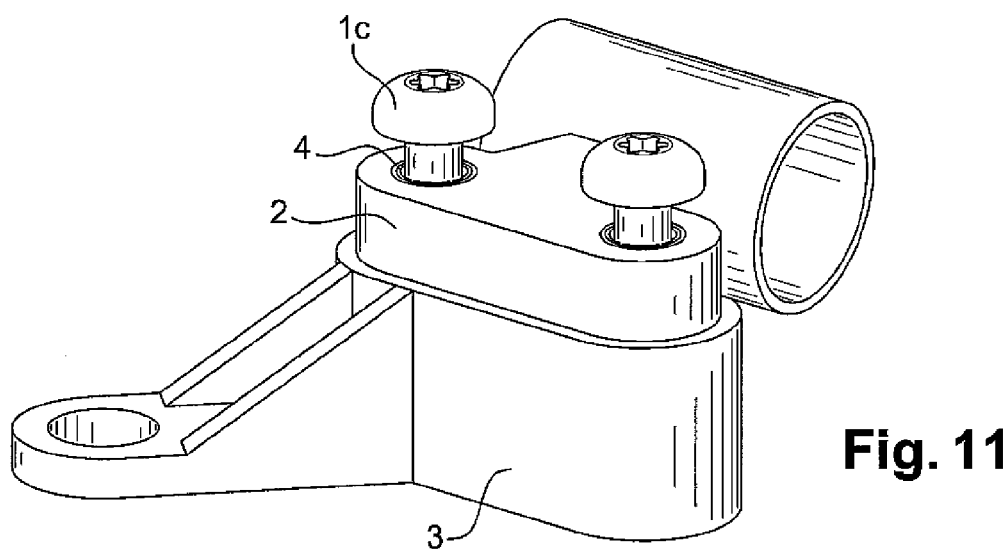
FIG. 11 is a view corresponding to FIG. 10 showing fitting and positioning of the element equipped with two screw/anti-creep ring assemblies onto a support before attachment of said element with the screws remaining trapped by the element.
Figure 12:
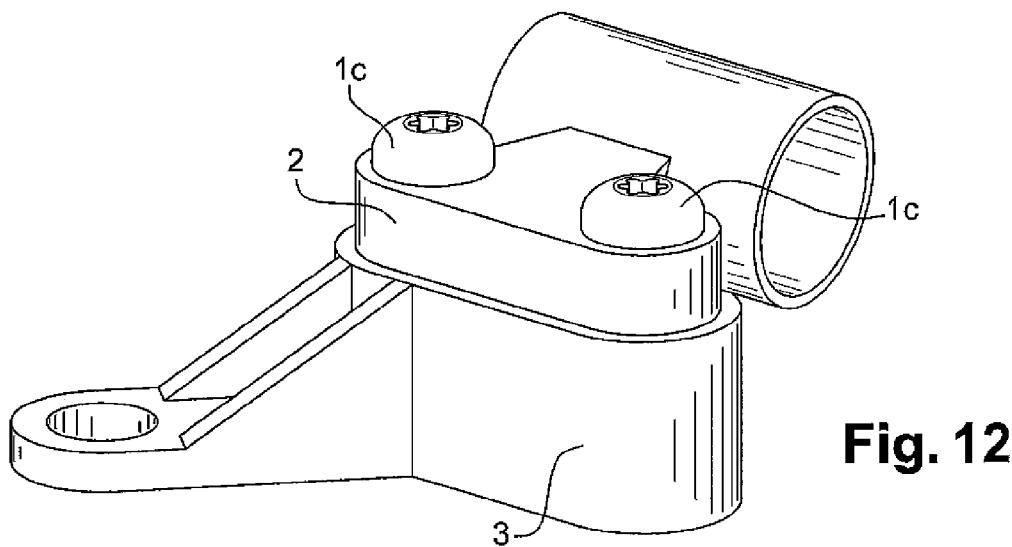
FIG. 12 is a view corresponding to FIG. 11 showing attachment of the element to the support.

FIGS. 10 to 12 show an example of an application of the device according to the invention. In FIG. 10, the screw (1)/anti-creep ring (4) assembly is engaged, under the conditions indicated above, in the recesses of element (2) which, in this example, is to a cable stop. FIG. 11 shows this cable stop equipped with two screw (1)/ring (4) assemblies positioned on the support where element (2) is to be attached. In this position, the screws are trapped by element (2). FIG. 12 shows the attachment of element (2) after the screws have been screwed into the support.

The advantages are readily apparent from the description, the following features in particular being emphasized and underlined:

After fitting the screw/anti-creep ring assembly in the corresponding recess, said anti-creep ring retains the captive screw with both functions (captive screw and anti-creep ring) being performed by a single component.

The use of conventional screws having a threaded portion with an outside diameter that is greater than the diameter of the screw shank.

The invention claimed is:

1. A device for securing a cap screw to a first element that is to be attached to a second element, comprising:
   a cap screw having a threaded portion with a nominal diameter that is greater than a diameter of its shank, and including an anti-creep ring designed to receive the cap screw, one end of which has a first feature suitable for delineating, before the anti-creep ring is engaged in a recess of the first element, a circular area having a first diameter that is greater than the nominal diameter of the threaded portion of the cap screw and, after said anti-creep ring has been engaged in said recess, a circular area having a second diameter that is less than the nominal diameter of the threaded portion but greater than the diameter of the shank, so as to act as a stop for said threaded portion and trap the cap screw in the anti-creep ring while permitting limited movement of the cap screw.

2. The device according to claim 1, wherein the anti-creep ring has a second feature suitable for allowing the anti-creep ring to undergo elastic deformation due to the effect of engaging the anti-creep ring in the recess of the first element, said deformation corresponding to a reduction in the diameter of the circular area.

3. A device according to claim 1, wherein the second feature of the anti-creep ring suitable for delineating the circular area having a variable diameter due to elastic deformation comprise a slot formed over the length of said anti-creep ring and wherein a stop effect is obtained by the first feature, the first feature including at least two projections formed so that they protrude from one end of a bore of the anti-creep ring.

4. A device according to claim 3, wherein the at least two projections are diametrically opposite each other.

5. A device according to claim 3, wherein the at least two projections are obtained by cutting and folding the anti-creep ring.

6. A device according to claim 1, wherein a length of the cap screw is greater than that of the anti-creep ring and the threaded portion is formed at a tip of the screw shank.

7. A device according to claim 1, wherein a length of the anti-creep ring corresponds substantially to a depth of the recess of the first element.

8. Use of the device according to claim 1 in the automotive field in order to attach a cable to a cable stop.

9. Use according to claim 8, wherein a cable is attached to the first element which receives at least the cap screw, with a cable stop constituting the second element.

* * * * *